(12) United States Patent
Watanabe et al.

(10) Patent No.: US 10,989,935 B2
(45) Date of Patent: Apr. 27, 2021

(54) MODULATION PATTERN CALCULATION DEVICE, LIGHT CONTROL DEVICE, MODULATION PATTERN CALCULATION METHOD, MODULATION PATTERN CALCULATION PROGRAM, AND STORAGE MEDIUM

(71) Applicant: HAMAMATSU PHOTONICS K.K., Hamamatsu (JP)

(72) Inventors: Koyo Watanabe, Hamamatsu (JP); Takashi Inoue, Hamamatsu (JP); Koji Takahashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 15/573,900

(22) PCT Filed: May 11, 2016

(86) PCT No.: PCT/JP2016/064031
§ 371 (c)(1),
(2) Date: Nov. 14, 2017

(87) PCT Pub. No.: WO2016/185974
PCT Pub. Date: Nov. 24, 2016

(65) Prior Publication Data
US 2018/0348549 A1 Dec. 6, 2018

(30) Foreign Application Priority Data
May 15, 2015 (JP) .............................. JP2015-100085

(51) Int. Cl.
*G02F 1/01* (2006.01)
*G02F 1/13* (2006.01)
*G02F 1/133* (2006.01)

(52) U.S. Cl.
CPC .............. *G02F 1/0121* (2013.01); *G02F 1/13* (2013.01); *G02F 1/133* (2013.01);
(Continued)

(58) Field of Classification Search
CPC .............. G02F 2203/12; G02F 2203/18; G02F 1/0121; G02F 1/01; G02F 1/13; G02F 1/133; G02F 2203/26; G02F 2203/50
See application file for complete search history.

(56) References Cited

U.S. PATENT DOCUMENTS

2004/0233944 A1*  11/2004  Dantus ............... G01N 21/4795
                                                    372/25
2005/0021243 A1*   1/2005  Dantus ................. H01J 49/162
                                                    702/28
(Continued)

FOREIGN PATENT DOCUMENTS

CN         1582407 A       2/2005
CN       101546037 A       9/2009
(Continued)

OTHER PUBLICATIONS

Robertson, MATLAB™ Answers "why we need to normalize the data?what is normalize data?" https://www.mathworks.com/matlabcentral/answers/216489-why-we-need-to-normalize-the-data-what-is-normalize-data (Year: 2015).*
(Continued)

*Primary Examiner* — George G King
(74) *Attorney, Agent, or Firm* — Faegre Drinker Biddle & Reath LLP

(57) ABSTRACT

A modulation pattern calculation apparatus includes an iterative Fourier transform unit, a filtering process unit, and a modulation pattern calculation unit. The iterative Fourier transform unit performs a Fourier transform on a waveform function including an intensity spectrum function and a
(Continued)

phase spectrum function, performs a replacement of a temporal intensity waveform function based on a desired waveform after the Fourier transform and then performs an inverse Fourier transform, and performs a replacement to constrain the phase spectrum function after the inverse Fourier transform. The filtering process unit performs a filtering process of cutting a part exceeding a cutoff intensity for each wavelength, on the intensity spectrum function in a frequency domain.

4 Claims, 16 Drawing Sheets

(52) U.S. Cl.
CPC ...... *G02F 2203/12* (2013.01); *G02F 2203/18* (2013.01); *G02F 2203/26* (2013.01); *G02F 2203/50* (2013.01)

(56) References Cited

U.S. PATENT DOCUMENTS

| | | |
|---|---|---|
| 2005/0063032 A1 | 3/2005 | Igasaki et al. |
| 2011/0122467 A1 | 5/2011 | Futterer et al. |
| 2014/0307299 A1 | 10/2014 | Matsumoto et al. |

FOREIGN PATENT DOCUMENTS

| | | |
|---|---|---|
| CN | 103812598 A | 5/2014 |
| JP | 2013-186350 A | 9/2013 |
| WO | WO-2009/063670 A1 | 5/2009 |
| WO | WO 2010/125367 A1 | 11/2010 |
| WO | WO 2014/017289 A1 | 1/2014 |
| WO | WO 2014/073611 A1 | 5/2014 |
| WO | WO-2014/136784 A1 | 9/2014 |

OTHER PUBLICATIONS

English translation of the First Office Action dated Nov. 26, 2019 on Chinese Patent Application 201680027961.9 (Year: 2019).*

Khan Academy webpage "Vector magnitude & normalization" (Year: 2014).*

International Preliminary Report on Patentability dated Nov. 30, 2017 for PCT/JP2016/064031.

Hacker, M., et al., "Iterative Fourier transform algorithm for phase-only pulse shaping," Optics Express, vol. 9, No. 4, 2001, pp. 191-199.

Matsumoto, N., et al., "An adaptive approachi for uniform scanning in multifocal multiphoton microscopy with a spatial light modulator," Optics Express, vol. 22, No. 1, 2014, pp. 633-645.

Pasienski, M., et al., "A high-accuracy algorithm for designing arbitrary holographic atom traps," Optics Express, vol. 16, No. 3, 2008, pp. 2176-2190.

Notification of First Office Action dated Nov. 26, 2019 in Chinese Patent Application No. 201680027961.9 (9 pages) with English translation (2 pages).

Lou et al, "Phase compensating algorithm investigation of real-time adaptive femtosecond pulse shaping", Proc. SPIE, 2013.

Notification of Second Office Action dated Sep. 15, 2020 is Chinese Patent Application No. 201680027961.9 (8 pages) with an English translation (3 pages).

* cited by examiner (a)

(b)

(a)

(b)

(a)

(b)

MODULATION PATTERN CALCULATION DEVICE, LIGHT CONTROL DEVICE, MODULATION PATTERN CALCULATION METHOD, MODULATION PATTERN CALCULATION PROGRAM, AND STORAGE MEDIUM

TECHNICAL FIELD

An aspect of the present invention relates to a modulation pattern calculation apparatus, a light control apparatus, a modulation pattern calculation method, a modulation pattern calculation program, and a computer readable medium.

BACKGROUND ART

Non Patent Document 1 discloses technology for modulating a phase spectrum using a spatial light modulator (SLM) to shape a light pulse. In this document, a phase spectrum to obtain a desired light pulse waveform is calculated using an iterative Fourier method (iterative Fourier transform algorithm: IFTA).

CITATION LIST

Non Patent Literature

Non Patent Document 1: M. Hacker, G. Stobrawa, T. Feurer, "Iterative Fourier transform algorithm for phase-only pulse shaping", Optics Express, Vol. 9, No. 4, pp. 191-199, 13 Aug. 2001

SUMMARY OF INVENTION

Technical Problem

For example, as technology for controlling a temporal waveform of a variety of light such as ultrashort pulse light, technology for modulating a phase spectrum and an intensity spectrum of a light pulse by the SLM is known. In this technology, a phase spectrum and an intensity spectrum to bring the temporal waveform of the light close to a desired waveform are calculated, and a modulation pattern to give the phase spectrum and the intensity spectrum to the light is presented on the SLM.

For the phase spectrum, the spectrum can be calculated using the normal iterative Fourier method, for example as in Non Patent Document 1 described above. On the other hand, for the intensity spectrum, it is difficult to calculate the spectrum in the normal iterative Fourier method. When the spectrum is calculated using the normal iterative Fourier method, an intensity spectrum larger than the intensity spectrum of the input light to the SLM may be calculated depending on a wavelength region, and it is difficult to generate light having the intensity spectrum from the input light. For this reason, in the conventional method, for example, a method of measuring a waveform of light after shaping and determining an intensity spectrum after trial and error is adopted, and there are problems in that time and effort are taken, and skill is required to obtain an intensity spectrum with high accuracy.

An object of one aspect of the present invention is to provide a modulation pattern calculation apparatus, a light control apparatus, a modulation pattern calculation method, a modulation pattern calculation program, and a computer readable medium capable of easily calculating an intensity spectrum to bring a temporal waveform of light close to a desired waveform.

Solution to Problem

In order to solve the above problem, a modulation pattern calculation apparatus according to one aspect of the present invention is an apparatus for calculating a modulation pattern presented on a spatial light modulator for modulating an intensity spectrum of input light to bring a temporal intensity waveform of light close to a desired waveform, and the apparatus includes an iterative Fourier transform unit for performing a Fourier transform on a waveform function in a frequency domain including an intensity spectrum function and a phase spectrum function, performing a replacement of a temporal intensity waveform function based on the desired waveform in a time domain after the Fourier transform and then performing an inverse Fourier transform, and performing a replacement to constrain the phase spectrum function in the frequency domain after the inverse Fourier transform; a filtering process unit for performing a filtering process of cutting a part exceeding a cutoff intensity for each wavelength determined on the basis of the intensity spectrum of the input light, on the intensity spectrum function in the frequency domain after the inverse Fourier transform or a normalized intensity spectrum function obtained by multiplying the intensity spectrum function by a normalization coefficient; and a modulation pattern calculation unit for calculating the modulation pattern on the basis of the intensity spectrum function or the normalized intensity spectrum function after the filtering process.

Further, a modulation pattern calculation method according to one aspect of the present invention is a method for calculating a modulation pattern presented on a spatial light modulator for modulating an intensity spectrum of input light to bring a temporal intensity waveform of light close to a desired waveform, and the method includes a step (Fourier transform step) of performing a Fourier transform on a waveform function in a frequency domain including an intensity spectrum function and a phase spectrum function; a step (inverse Fourier transform step) of performing a replacement of a temporal intensity waveform function based on the desired waveform in a time domain after the Fourier transform and then performing an inverse Fourier transform; a step (replacement step) of performing a replacement to constrain the phase spectrum function in the frequency domain after the inverse Fourier transform; a step (filtering process step) of performing a filtering process of cutting a part exceeding a cutoff intensity for each wavelength determined on the basis of the intensity spectrum of the input light, on the intensity spectrum function in the frequency domain after the inverse Fourier transform or a normalized intensity spectrum function obtained by multiplying the intensity spectrum function by a normalization coefficient; and a step (modulation pattern calculation step) of calculating the modulation pattern on the basis of the intensity spectrum function or the normalized intensity spectrum function after the filtering process.

Further, a modulation pattern calculation program according to one aspect of the present invention is a program for causing a computer to calculate a modulation pattern presented on a spatial light modulator for modulating an intensity spectrum of input light to bring a temporal intensity waveform of light close to a desired waveform, and the program causes the computer to execute a step (Fourier transform step) of performing a Fourier transform on a waveform function in a frequency domain including an intensity spectrum function and a phase spectrum function; a step (inverse Fourier transform step) of performing a replacement of a temporal intensity waveform function based on the desired waveform in a time domain after the Fourier transform and then performing an inverse Fourier transform; a step (replacement step) of performing a replacement to constrain the phase spectrum function in the frequency domain after the inverse Fourier transform; a step (filtering process step) of performing a filtering process of cutting a part exceeding a cutoff intensity for each wavelength determined on the basis of the intensity spectrum of the input light, on the intensity spectrum function in the frequency domain after the inverse Fourier transform or a normalized intensity spectrum function obtained by multiplying the intensity spectrum function by a normalization coefficient; and a step (modulation pattern calculation step) of calculating the modulation pattern on the basis of the intensity spectrum function or the normalized intensity spectrum function after the filtering process.

In the above apparatus, the method, and the program, the intensity spectrum to bring the temporal intensity waveform of the light close to the desired waveform is calculated in the iterative Fourier transform unit or the replacement step. At that time, as described above, an intensity spectrum larger than the intensity spectrum of the input light may be calculated depending on a wavelength region. Therefore, in the above apparatus and the method, the filtering process based on the intensity spectrum of the input light is performed on the intensity spectrum (or the intensity spectrum obtained by multiplying the intensity spectrum by the normalization coefficient) obtained by the inverse Fourier transform. That is, the part exceeding the cutoff intensity for each wavelength determined on the basis of the intensity spectrum of the input light is cut. As a result, the intensity spectrum provided to the modulation pattern calculation unit or the modulation pattern calculation step can be suppressed to the extent that the intensity spectrum does not exceed the intensity spectrum of the input light. Therefore, according to the above apparatus and the method, the intensity spectrum to bring the temporal intensity waveform of the light close to the desired waveform can be easily calculated using the iterative Fourier transform.

Further, a light control apparatus according to one aspect of the present invention includes the modulation pattern calculation apparatus having the above configuration; a light source for outputting the input light; a dispersive element for spectrally dispersing the input light; a spatial light modulator for modulating the intensity spectrum of the input light after the dispersion and outputting modulated light; and an optical system for focusing the modulated light. The spatial light modulator presents the modulation pattern calculated by the modulation pattern calculation apparatus.

According to this apparatus, the modulation pattern calculation apparatus having the above configuration is included, so that the intensity spectrum to bring the temporal waveform of the light close to the desired waveform can be easily calculated.

Advantageous Effects of Invention

According to a modulation pattern calculation apparatus, a light control apparatus, a modulation pattern calculation method, a modulation pattern calculation program, and a computer readable medium according to one aspect of the present invention, an intensity spectrum to bring a temporal waveform of light close to a desired waveform can be easily calculated.

DESCRIPTION OF EMBODIMENTS

Hereinafter, embodiments of a modulation pattern calculation apparatus, a light control apparatus, a modulation pattern calculation method, and a modulation pattern calculation program according to one aspect of the present invention will be described in detail with reference to the accompanying drawings. In the description of the drawings, the same elements will be denoted by the same reference signs, without redundant description.

Figure 1:
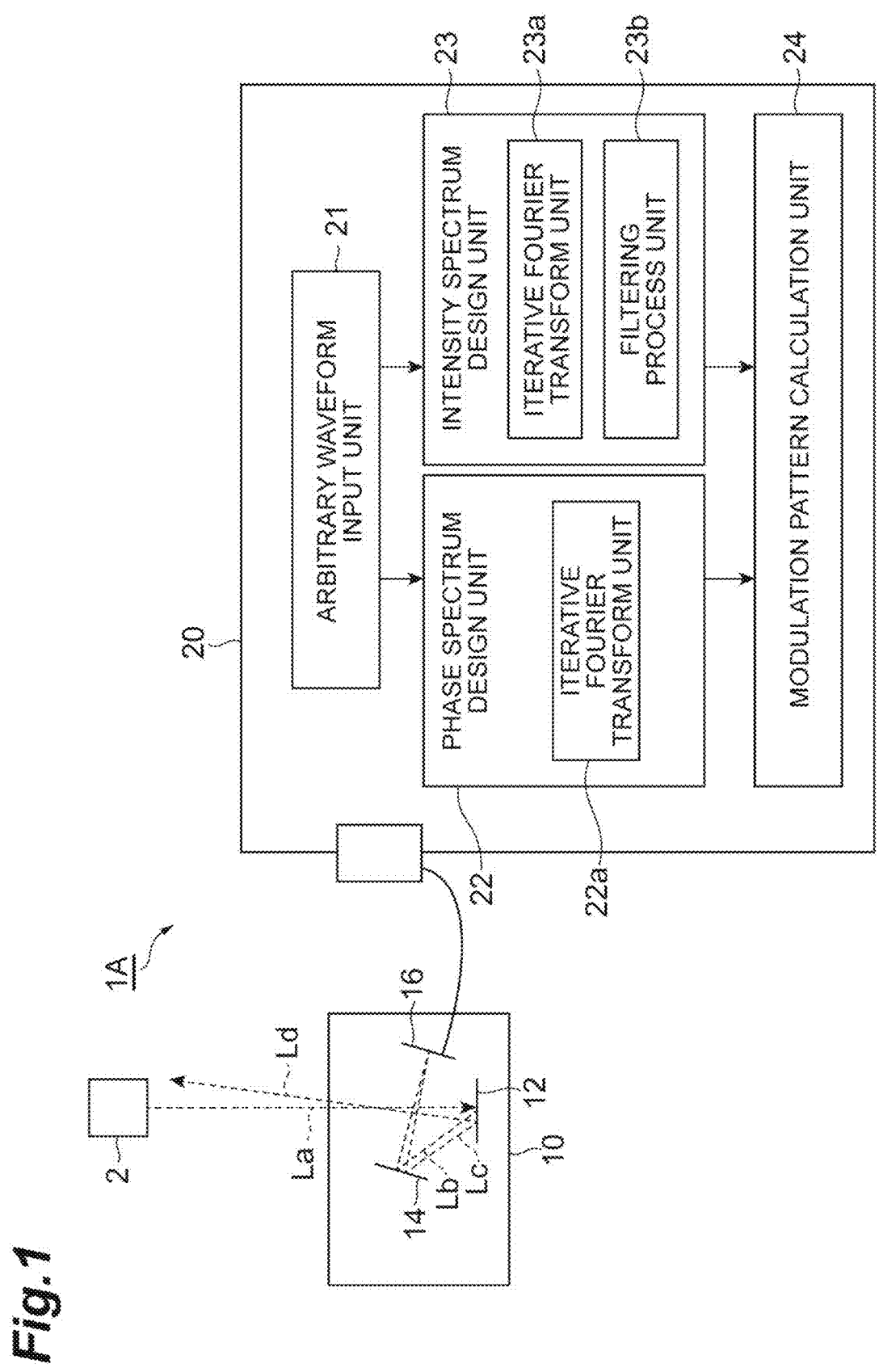
FIG. 1 is a diagram schematically illustrating a configuration of a light control apparatus according to an embodiment.

FIG. 1 is a diagram schematically illustrating a configuration of a light control apparatus 1A according to an embodiment of the present invention. The light control apparatus LA according to the present embodiment generates, from input light La, output light Ld having an arbitrary temporal intensity waveform different from that of the input light La. As illustrated in FIG. 1, the light control apparatus 1A includes a light source 2, an optical system 10, and a modulation pattern calculation apparatus 20.

The light source 2 outputs the input light La input to the optical system 10. The light source 2 is a laser light source such as a solid-state laser light source, for example, and the input light La is coherent pulse light, for example.

The optical system 10 has a dispersive element 12, a curved mirror 14, and an SLM 16. The dispersive element 12 is optically coupled to the light source 2, and the SLM 16 is optically coupled to the dispersive element 12 via the curved mirror 14. The dispersive element 12 spectrally disperses the input light La for each wavelength component. The dispersive element 12 has a diffraction grating formed on a plate surface, for example. Further, the dispersive element 12 may have a prism. The input light La is obliquely incident on the diffraction grating, and is spectrally dispersed into a plurality of wavelength components. Light Lb including the plurality of wavelength components reaches the curved mirror 14. The light Lb is reflected by the curved mirror 14 and reaches the SLM 16.

The SLM 16 simultaneously performs phase modulation and intensity modulation of the light Lb to generate the output light Ld having an arbitrary temporal intensity waveform different from the waveform of the input light La. The SLM 16 is of a phase modulation type, for example. In one example, the SLM 16 is of an LCOS (liquid crystal on silicon) type.

Figure 2:
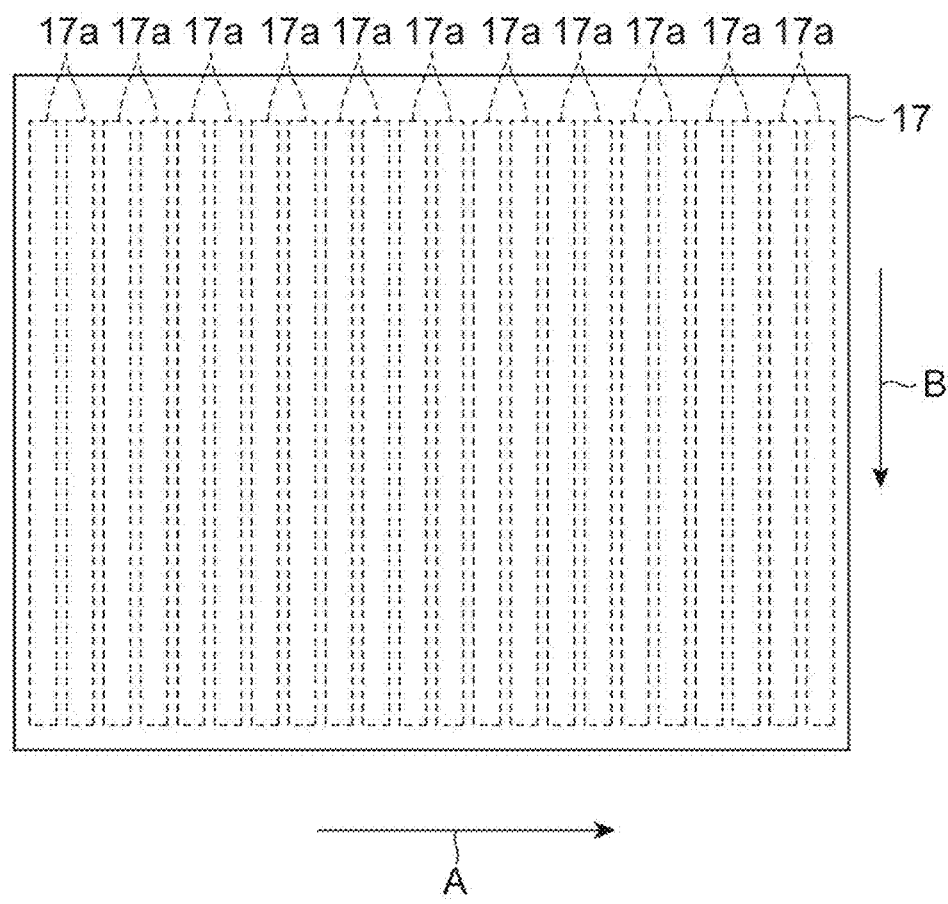
FIG. 2 is a diagram illustrating a modulation plane of an SLM.

FIG. 2 is a diagram illustrating a modulation plane 17 of the SLM 16. As illustrated in FIG. 2, in the modulation plane 17, a plurality of modulation regions 17a are arranged along a certain direction A, and each modulation region 17a extends in a direction B intersecting with the direction A. The direction A is a dispersing direction by the dispersive element 12. Therefore, each of the spectrally dispersed wavelength components is incident on each of the plurality of modulation regions 17a. The SLM 16 modulates a phase and an intensity of each incident wavelength component in each modulation region 17a. Because the SLM 16 in the present embodiment is of the phase modulation type, the intensity modulation is realized by a phase pattern (phase image) presented on the modulation plane 17.

Modulated light Lc including the respective wavelength components modulated by the SLM 16 is reflected again by the curved mirror 14 and reaches the dispersive element 12. At this time, the curved mirror 14 functions as a focusing optical system for focusing the modulated light Lc. Further, the dispersive element 12 functions as a combining optical system and combines the respective wavelength components after the modulation. That is, by the curved mirror 14 and the dispersive element 12, the plurality of wavelength components of the modulated light Lc are focused and combined with each other and become the output light Ld. The output light Ld is light having a desired temporal intensity waveform different from the waveform of the input light La.

The modulation pattern calculation apparatus 20 is a computer having an operation circuit such as a processor. The modulation pattern calculation apparatus 20 is electrically coupled to the SLM 16, calculates a phase modulation pattern to bring the temporal intensity waveform of the output light Ld close to a desired waveform, and provides a control signal including the phase modulation pattern to the SLM 16.

The modulation pattern calculation apparatus 20 of the present embodiment presents, on the SLM 16, a phase pattern including a phase pattern for phase modulation that gives a phase spectrum for obtaining the desired waveform to the output light Ld and a phase pattern for intensity modulation that gives an intensity spectrum for obtaining the desired waveform to the output light Ld. For this purpose, the modulation pattern calculation apparatus 20 includes an arbitrary waveform input unit 21, a phase spectrum design unit 22, an intensity spectrum design unit 23, and a modulation pattern calculation unit 24. That is, the operation circuit (for example, the processor of the computer) provided in the modulation pattern calculation apparatus 20 realizes a function of the arbitrary waveform input unit 21, a function of the phase spectrum design unit 22, a function of the intensity spectrum design unit 23, and a function of the modulation pattern calculation unit 24. The respective functions may be realized by the same operation circuit or may be realized by different operation circuits.

The operation circuit (for example, the processor of the computer) can realize the above respective functions by a modulation pattern calculation program. Therefore, the modulation pattern calculation program operates the operation circuit (for example, the processor of the computer) as the arbitrary waveform input unit 21, the phase spectrum design unit 22, the intensity spectrum design unit 23, and the modulation pattern calculation unit 24 in the modulation pattern calculation apparatus 20. The modulation pattern calculation program is stored in a storage device (non-transitory computer readable medium) inside or outside the computer.

The arbitrary waveform input unit 21 receives the desired temporal intensity waveform input from an operator. The operator inputs information (for example, a pulse width) on the desired temporal intensity waveform to the arbitrary waveform input unit 21.

The information on the desired temporal intensity waveform is given to the phase spectrum design unit 22 and the intensity spectrum design unit 23. The phase spectrum design unit 22 calculates a corresponding phase spectrum of the output light Ld, on the basis of the temporal intensity waveform. The intensity spectrum design unit 23 calculates a corresponding intensity spectrum of the output light Ld, on the basis of the temporal intensity waveform. Here, a spectrum calculation method in the phase spectrum design unit 22 and the intensity spectrum design unit 23 will be described in detail later.

The modulation pattern calculation unit 24 is an example of a modulation pattern calculation unit according to the present invention and calculates a phase modulation pattern to give the phase spectrum obtained in the phase spectrum design unit 22 and the intensity spectrum obtained in the intensity spectrum design unit 23 to the output light Ld. Further, a control signal including the calculated phase modulation pattern is provided to the SLM 16.

Figure 3:
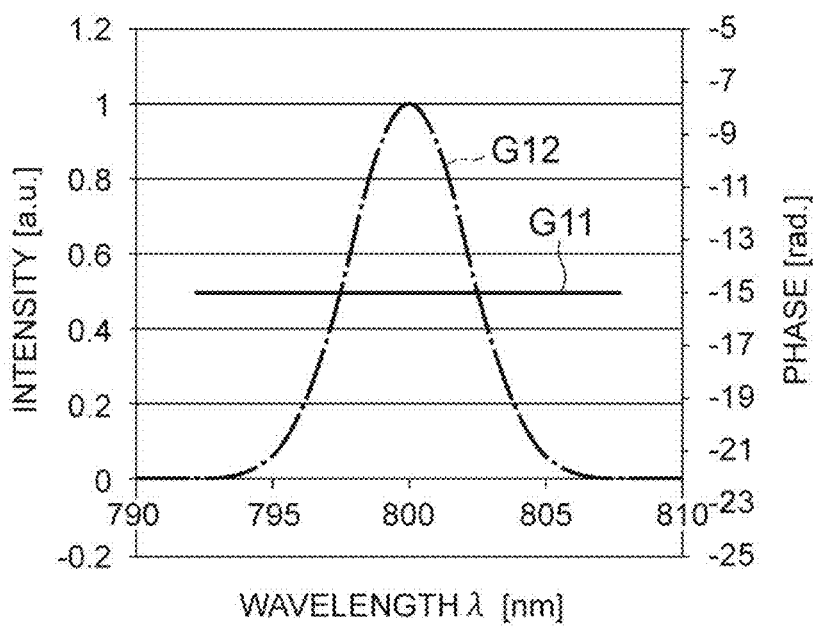
FIG. 3 includes (a) a graph illustrating an example of a combination of a certain phase spectrum and a certain intensity spectrum, and (b) a graph illustrating a temporal intensity waveform of output light realized by the combination of the phase spectrum and the intensity spectrum illustrated in (a) in FIG. 3.
Figure 3:
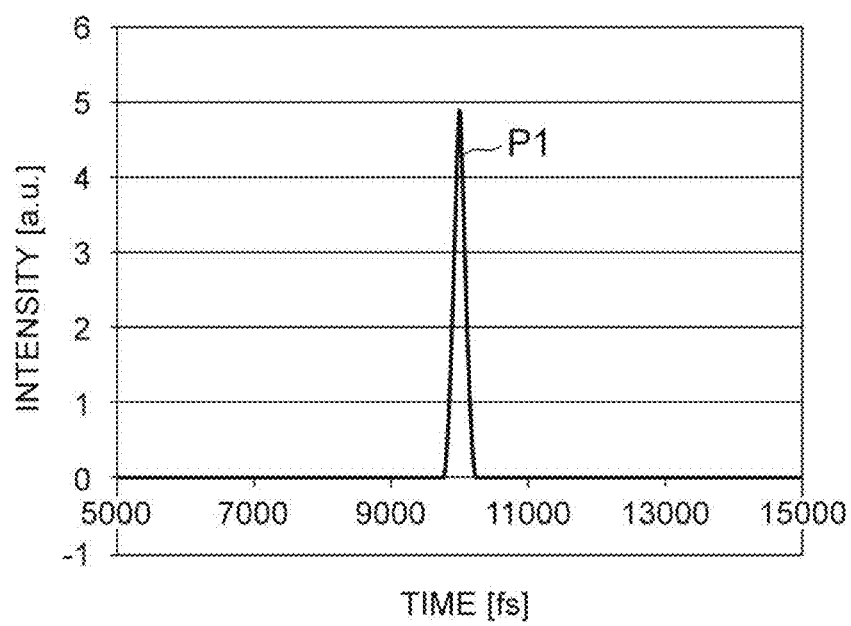

Here, a method of calculating a phase spectrum and an intensity spectrum corresponding to a desired temporal intensity waveform is described in detail. (a) in FIG. 3 is a graph illustrating an example of a combination of a certain phase spectrum G11 and a certain intensity spectrum G12. Further, (b) in FIG. 3 is a graph illustrating a temporal intensity waveform of the output light Ld realized by the combination of the phase spectrum and the intensity spectrum illustrated in (a) in FIG. 3. In (a) in FIG. 3, a horizontal axis shows a wavelength (nm), a left vertical axis shows an intensity value (arbitrary unit) of the intensity spectrum, and a right vertical axis shows a phase value (rad) of the phase spectrum. Further, in (b) in FIG. 3, a horizontal axis shows a time (femtosecond) and a vertical axis shows a light intensity (arbitrary unit). The spectra and the waveform illustrated in FIG. 3 are examples, and the temporal intensity waveform of the output light Ld can be shaped in various forms by combinations of various phase spectra and intensity spectra.

The desired temporal intensity waveform is represented as a function in a time domain, and the phase spectrum and the intensity spectrum are represented as functions in a frequency domain. Therefore, the phase spectrum and the intensity spectrum corresponding to the desired temporal intensity waveform are obtained by an iterative Fourier transform based on the desired temporal intensity waveform. In the method described below, the phase spectrum and the intensity spectrum are calculated using an iterative Fourier transform method. Therefore, as illustrated in FIG. 1, the phase spectrum design unit 22 has an iterative Fourier transform unit 22a. Further, the intensity spectrum design unit 23 has an iterative Fourier transform unit 23a and a filtering process unit 23b.

Figure 4:
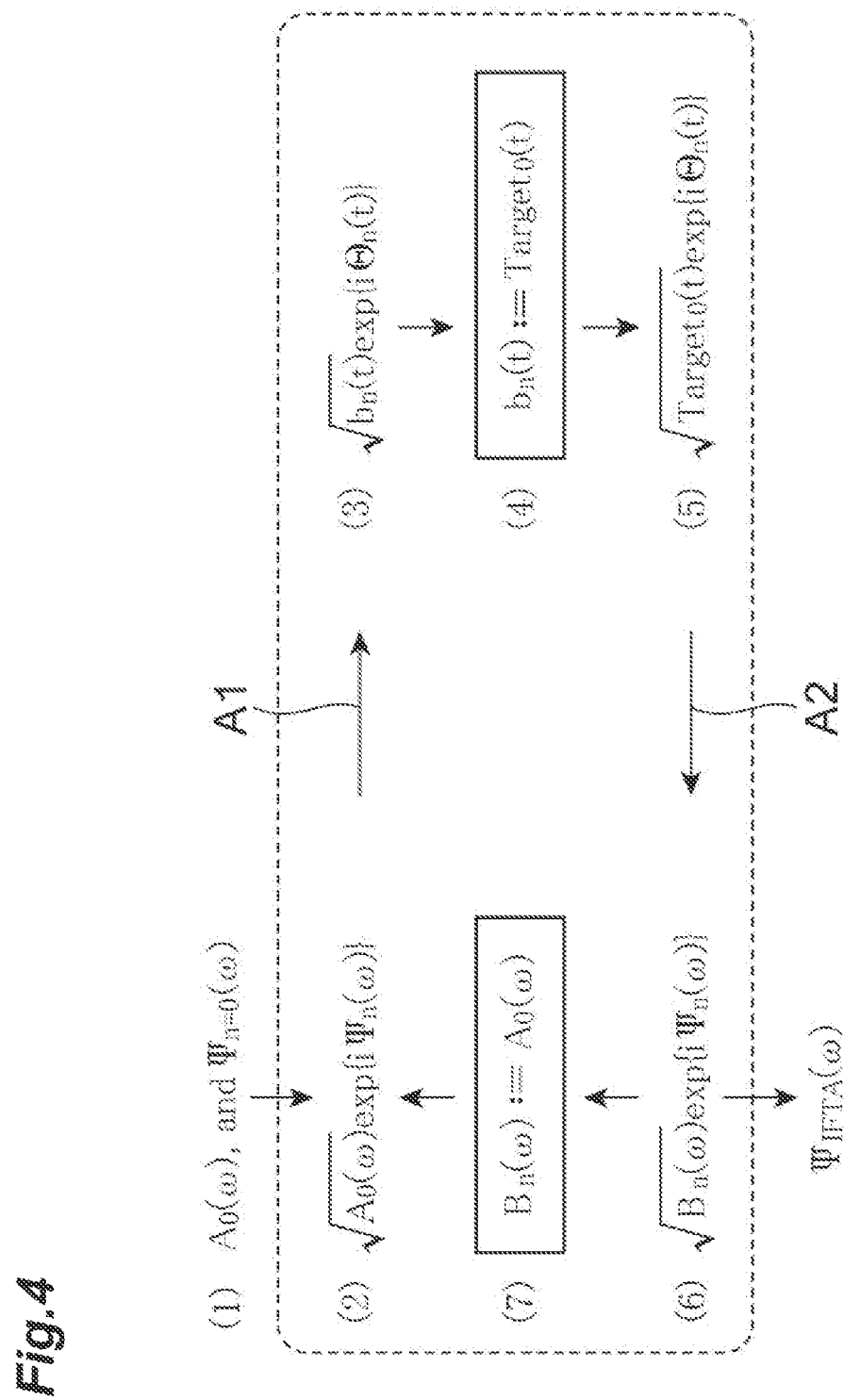
FIG. 4 is a diagram illustrating a calculation procedure in an iterative Fourier transform unit of a phase spectrum design unit.

FIG. 4 illustrates a calculation procedure in the iterative Fourier transform unit 22a of the phase spectrum design unit 22. First, the iterative Fourier transform unit 22a prepares an initial intensity spectrum function $A_0(\omega)$ and a phase spectrum function $\Psi_0(\omega)$ to be functions of a frequency $\omega$ (process number (1) in the drawing). In one example, the intensity spectrum function $A_0(\omega)$ and the phase spectrum function $\Psi_0(\omega)$ represent the intensity spectrum and the phase spectrum of the input light La, respectively.

Next, the iterative Fourier transform unit 22a prepares a waveform function (a) in the frequency domain including the intensity spectrum function $A_0(\omega)$ and the phase spectrum function $\Psi_n(\omega)$ (process number (2) in the drawing).

[Formula 1]

$$\sqrt{A_0(\omega)}\exp\{i\Psi_n(\omega)\} \qquad (a)$$

Here, a subscript n represents after an n-th Fourier transform process. Before a first Fourier transform process, the initial phase spectrum function $\Psi_0(\omega)$ described above is used as the phase spectrum function $\Psi_n(\omega)$. i is an imaginary number.

Next, the iterative Fourier transform unit 22a performs a Fourier transform from the frequency domain to the time domain on the function (a) (arrow A1 in the drawing). As a result, a waveform function (b) in the frequency domain including a temporal intensity waveform function $b_n(t)$ is obtained (process number (3) in the drawing).

[Formula 2]

$$\sqrt{b_n(t)}\exp\{i\Theta_n(t)\} \qquad (b)$$

Next, the iterative Fourier transform unit 22a replaces the temporal intensity waveform function $b_n(t)$ included in the function (b) by $Target_0(t)$ based on the desired waveform (process numbers (4) and (5) in the drawing).

[Formula 3]

$$b_n(t):=Target_0(t) \qquad (c)$$

[Formula 4]

$$\sqrt{Target_0(t)}\exp\{i\Theta_n(t)\} \qquad (d)$$

Next, the iterative Fourier transform unit 22a performs an inverse Fourier transform from the time domain to the frequency domain on the function (d) (arrow A2 in the drawing). As a result, a waveform function (e) in the frequency domain including an intensity spectrum function $B_n(\omega)$ and the phase spectrum function $\Psi_n(\omega)$ is obtained (process number (6) in the drawing).

[Formula 5]

$$\sqrt{B_n(\omega)}\exp\{i\Psi_n(\omega)\} \qquad (e)$$

Next, the iterative Fourier transform unit 22a, to constrain the intensity spectrum function $B_n(\omega)$ included in the function (e), replaces the function by the initial intensity spectrum function $A_0(\omega)$ (process number (7) in the drawing).

[Formula 6]

$$B_n(\omega):=A_0(\omega) \qquad (f)$$

Subsequently, the iterative Fourier transform unit 22a repeatedly performs the above processes (1) to (7) a plurality of times, so that the phase spectrum form represented by the phase spectrum function $\Psi_n(\omega)$ in the waveform function can be brought close to a phase spectrum form corresponding to the desired temporal intensity waveform. A phase spectrum function $\Psi_{IFTA}(\omega)$ to be finally obtained is provided to the modulation pattern calculation unit 24.

Figure 5:
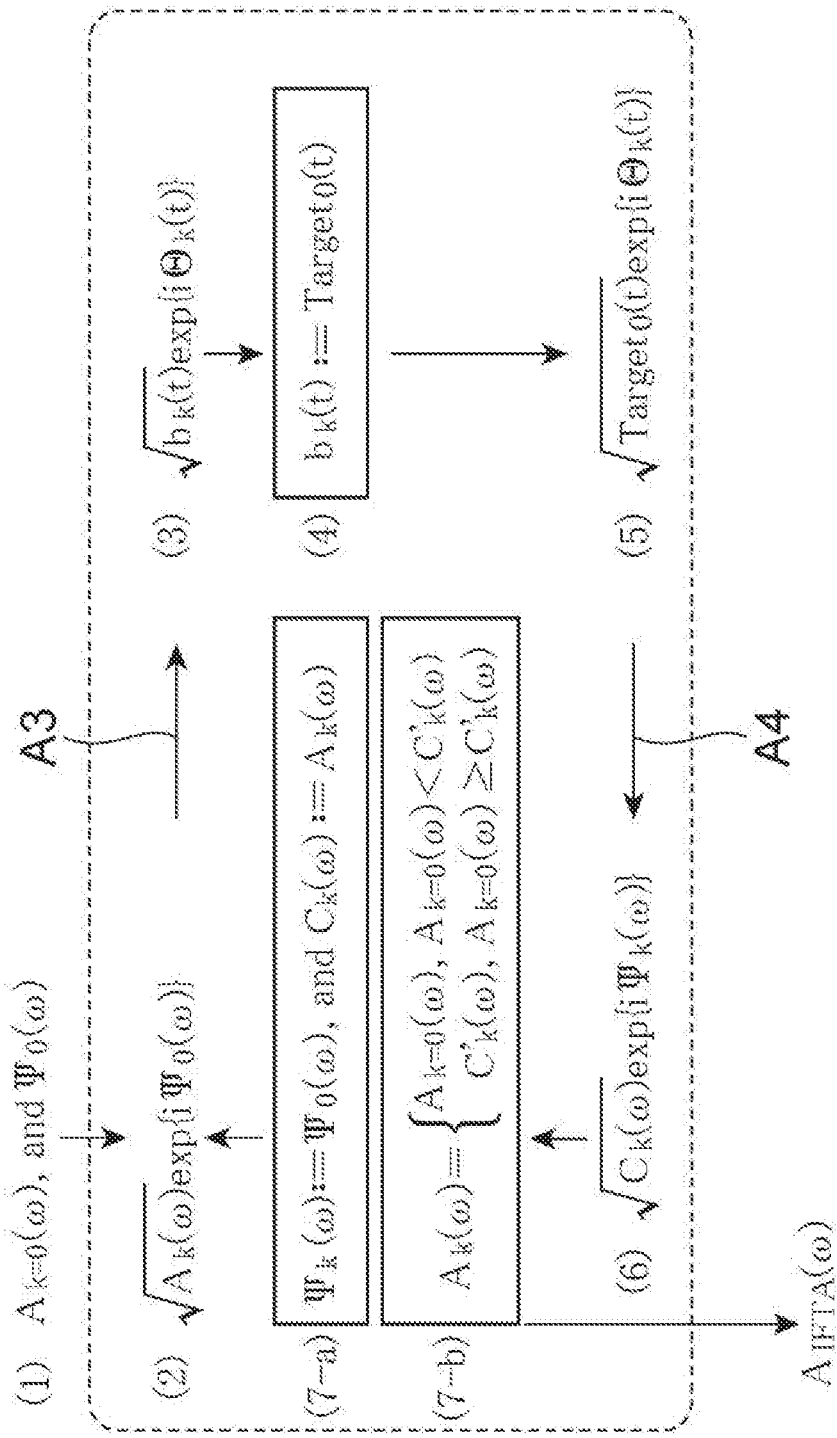
FIG. 5 is a diagram illustrating a calculation procedure in an iterative Fourier transform unit and a filtering process unit of an intensity spectrum design unit.

FIG. 5 illustrates a calculation procedure in the iterative Fourier transform unit 23a and the filtering process unit 23b of the intensity spectrum design unit 23. First, similar to when the phase spectrum is calculated, the iterative Fourier transform unit 23a prepares an initial intensity spectrum function $A_{k=0}(\omega)$ and a phase spectrum function $\Psi_0(\omega)$ (process number (1) in the drawing). Next, the iterative Fourier transform unit 23a prepares a waveform function (g) in the frequency domain including an intensity spectrum function $A_k(\omega)$ and the phase spectrum function $\Psi_0(\omega)$ (process number (2) in the drawing).

[Formula 7]

$$\sqrt{A_k(\omega)}\exp\{i\Psi_0(\omega)\} \qquad (g)$$

Here, a subscript k represents after a k-th Fourier transform process. Before a first Fourier transform process, the initial intensity spectrum function $A_{k=0}(\omega)$ described above is used as the intensity spectrum function $A_k(\omega)$. i is an imaginary number.

Next, the iterative Fourier transform unit 23a performs the Fourier transform from the frequency domain to the time domain on the function (g) (arrow A3 in the drawing). As a result, a waveform function (h) in the frequency domain including a temporal intensity waveform function $b_k(t)$ is obtained (process number (3) in the drawing).

[Formula 8]

$$\sqrt{b_k(t)}\exp\{i\Theta_k(t)\} \qquad (h)$$

Next, the iterative Fourier transform unit 23a replaces the temporal intensity waveform function $b_k(t)$ included in the function (h) by a function $Target_0(t)$ based on the desired waveform (process numbers (4) and (5) in the drawing).

[Formula 9]

$$b_k(t):=Target_0(t) \qquad (i)$$

[Formula 10]

$$\sqrt{Target_0(t)}\exp\{i\Theta_k(t)\} \qquad (j)$$

Next, the iterative Fourier transform unit 23a performs the inverse Fourier transform from the time domain to the frequency domain on the function (j) (arrow A4 in the drawing). As a result, a waveform function (k) in the frequency domain including an intensity spectrum function $C_k(\omega)$ and a phase spectrum function $\Psi_k(\omega)$ is obtained (process number (6) in the drawing).

[Formula 11]

$$\sqrt{C_k(\omega)}\exp\{i\Psi_k(\omega)\} \qquad (k)$$

Next, the iterative Fourier transform unit 23a, to constrain the phase spectrum function $\Psi_k(\omega)$ included in the function (k), replaces the function by the initial phase spectrum function $\Psi_0(\omega)$ (process number (7-a) in the drawing).

[Formula 12]

$$\Psi_k(\omega) := \Psi_0(\omega) \qquad (m)$$

Further, the filtering process unit 23b performs a filtering process based on the intensity spectrum of the input light La, on the intensity spectrum function $C_k(\omega)$ in the frequency domain after the inverse Fourier transform. Specifically, a part exceeding a cutoff intensity for each wavelength determined on the basis of the intensity spectrum of the input light La in an intensity spectrum represented by the intensity spectrum function $C_k(\omega)$ is cut.

In one example, the cutoff intensity for each wavelength is set to coincide with the intensity spectrum of the input light La (in the present embodiment, the initial intensity spectrum function $A_{k=0}(\omega)$). In this case, as shown by the following formula (n), at a frequency where the intensity spectrum function $C_k(\omega)$ is larger than the initial intensity spectrum function $A_{k=0}(\omega)$, a value of the initial intensity spectrum function $A_{k=0}(\omega)$ is taken as a value of the intensity spectrum function $A_k(\omega)$. Further, at a frequency where the intensity spectrum function $C_k(\omega)$ is equal to or smaller than the initial intensity spectrum function $A_{k=0}(\omega)$, a value of the intensity spectrum function $C_k(\omega)$ is taken as the value of the intensity spectrum function $A_k(\omega)$ (process number (7-b) in the drawing).

[Formula 13]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \qquad (n)$$

The filtering process unit 23b replaces the intensity spectrum function $C_k(\omega)$ included in the function (k) by the intensity spectrum function $A_k(\omega)$ after the filtering process based on the formula (n).

Subsequently, the above processes (1) to (7-b) are repeatedly performed, so that the intensity spectrum form represented by the intensity spectrum function $A_k(\omega)$ in the waveform function can be brought close to an intensity spectrum form corresponding to the desired temporal intensity waveform. An intensity spectrum function $A_{IFTA}(\omega)$ to be finally obtained is provided to the modulation pattern calculation unit 24.

Figure 6:
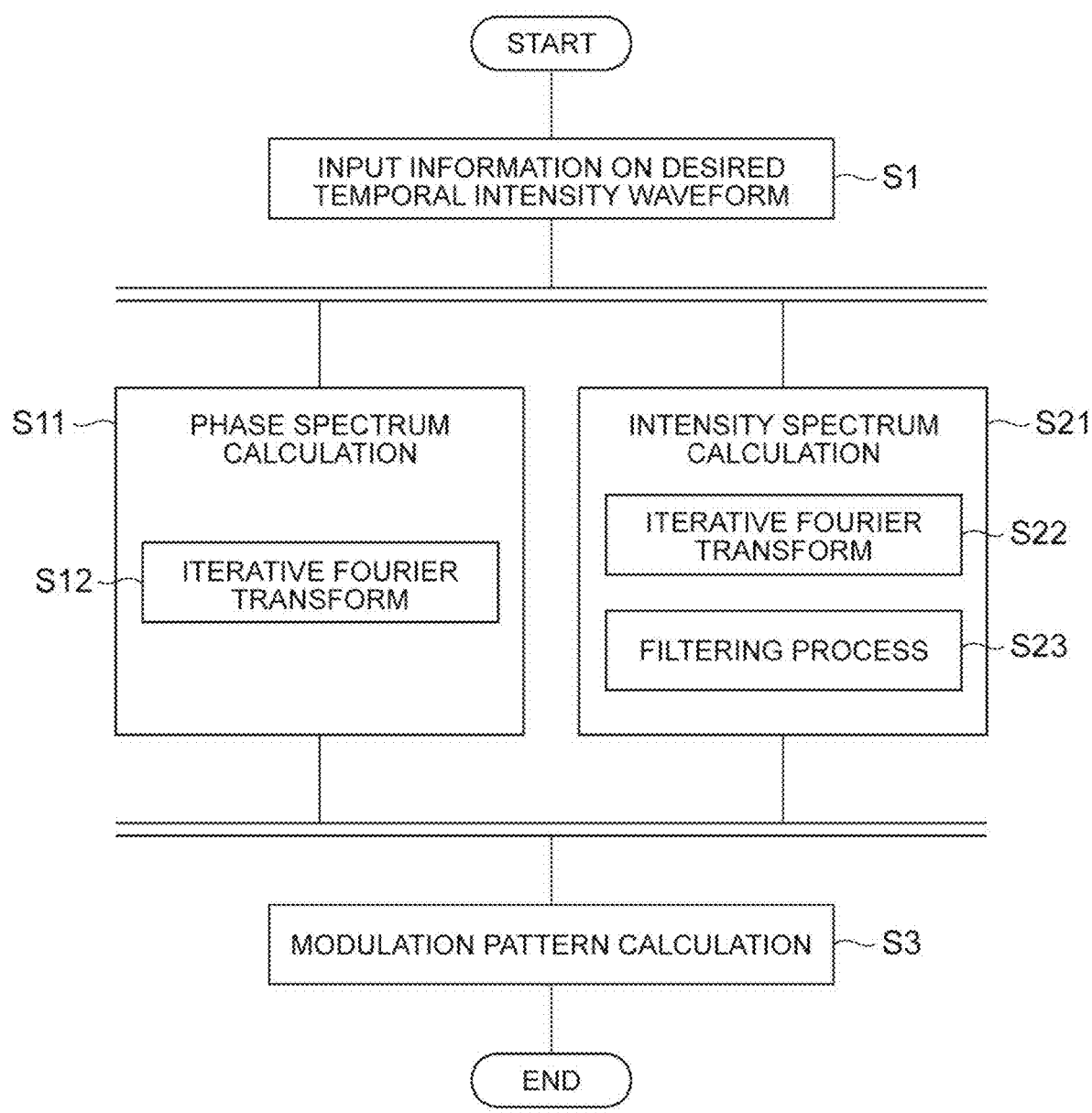
FIG. 6 is a flowchart illustrating a modulation pattern calculation method.

FIG. 6 is a flowchart illustrating a modulation pattern calculation method realized by the modulation pattern calculation apparatus 20 described above. As illustrated in FIG. 6, first, information on a desired temporal intensity waveform is input to the arbitrary waveform input unit 21 by the operator (input step S1). Next, a phase spectrum and an intensity spectrum to bring the temporal intensity waveform close to a desired waveform are calculated in the phase spectrum design unit 22 and the intensity spectrum design unit 23, respectively (phase spectrum calculation step S11 and intensity spectrum calculation step S21).

An iterative Fourier transform step S12 by the iterative Fourier transform unit 22a is included in the phase spectrum calculation step S11.

That is, in the iterative Fourier transform step S12, the Fourier transform is performed on the waveform function (formula (a)) in the frequency domain including the intensity spectrum function $A_0(\omega)$ and the phase spectrum function $\Psi_n(\omega)$, the replacement of the temporal intensity waveform function based on the desired waveform is performed in the time domain after the Fourier transform (formula (c)), and the replacement to constrain the intensity spectrum function is performed in the frequency domain after the inverse Fourier transform in (formula (f)). In the iterative Fourier transform step S12, these processes are repeatedly performed a plurality of times, so that the phase spectrum function $\Psi_n(\omega)$ is brought close to a phase spectrum form corresponding to the desired waveform. A phase spectrum function $\Psi_{IFTA}(\omega)$ to be finally obtained is provided to a next modulation pattern calculation step S3.

Further, an iterative Fourier transform step S22 by the iterative Fourier transform unit 23a and a filtering process step S23 by the filtering process unit 23b are included in the intensity spectrum calculation step S21.

That is, in the iterative Fourier transform step S22, the Fourier transform is performed on the waveform function (formula (g)) in the frequency domain including the intensity spectrum function $A_k(\omega)$ and the phase spectrum function $\Psi_0(\omega)$, the replacement of the temporal intensity waveform function based on the desired waveform is performed in the time domain after the Fourier transform (formula (i)), and the replacement to constrain the phase spectrum function is performed in the frequency domain after the inverse Fourier transform (formula (m)). In addition, in the filtering process step S23, the filtering process of cutting the part exceeding the cutoff intensity for each wavelength determined on the basis of the intensity spectrum of the input light La is performed on the intensity spectrum function in the frequency domain after the inverse Fourier transform (formula (n)). Further, the iterative Fourier transform step S22 and the filtering process step S23 are repeatedly performed a plurality of times, so that the intensity spectrum function $A_k(\omega)$ is brought close to an intensity spectrum foam corresponding to the desired waveform. An intensity spectrum function $A_{IFTA}(\omega)$ to be finally obtained is provided to the next modulation pattern calculation step S3.

In the modulation pattern calculation step S3, a modulation pattern is calculated on the basis of the phase spectrum function $\Psi_{IFTA}(\omega)$ and the intensity spectrum function $A_{IFTA}(\omega)$. The modulation pattern is presented on the SLM 16.

Effects obtained by the modulation pattern calculation apparatus 20 and the modulation pattern calculation method according to the present embodiment described above are described.

In the present embodiment, when the intensity spectrum is designed, a calculation method different from a method for the phase spectrum is adopted. If the intensity spectrum is calculated by the same calculation method as the method for the phase spectrum, an intensity spectrum larger than the intensity spectrum of the input light may be calculated depending on a wavelength region.

Figure 7:
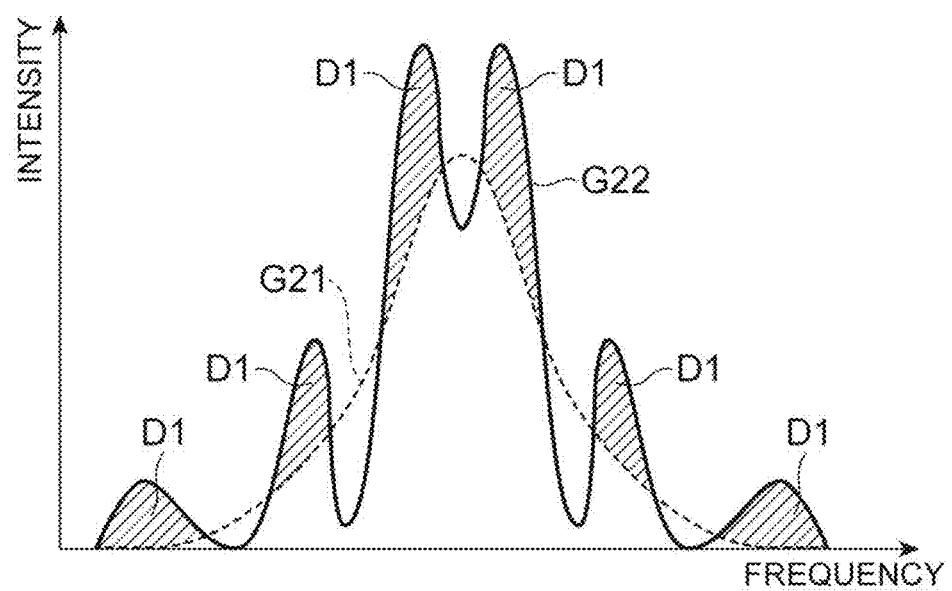
FIG. 7 is a diagram illustrating an intensity spectrum of input light and a calculated intensity spectrum.

FIG. 7 is a graph illustrating an example of such a state, and a vertical axis represents an intensity and a horizontal axis represents a frequency. Further, a dashed line G21 represents an intensity spectrum of the input light La (refer to FIG. 1) and a solid line G22 represents a calculated intensity spectrum. In this example, in the calculated intensity spectrum G22, intensity of a region D1 shown by hatching exceeds intensity of the intensity spectrum G21 of the input light La. The intensity spectrum G22 cannot be realized in the output light Ld, and for this reason, even if an intensity modulation pattern is generated on the basis of the intensity spectrum G22, the temporal intensity waveform of the output light Ld does not become the desired waveform.

Figure 8:
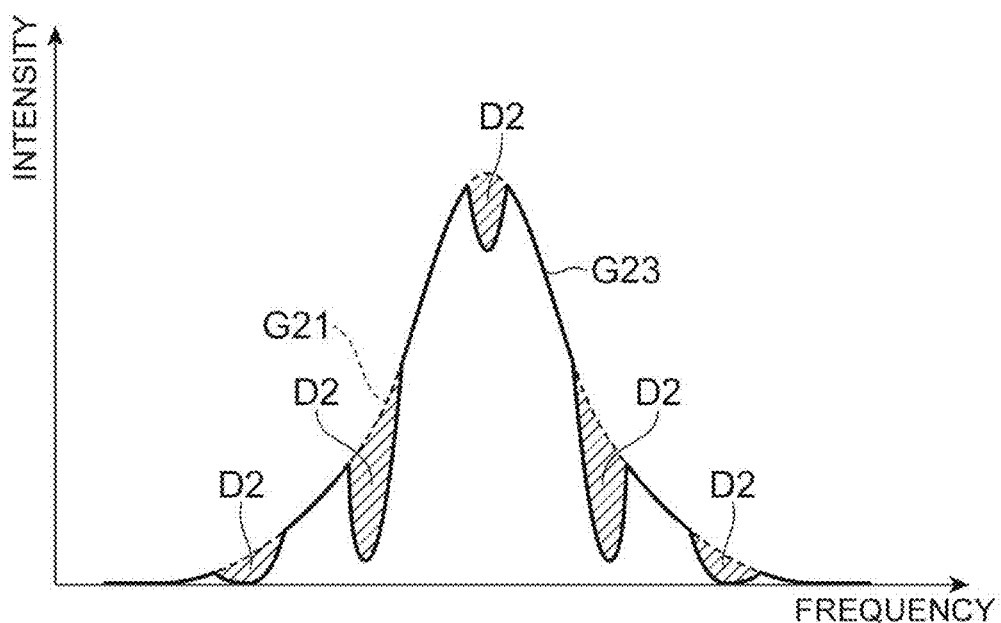
FIG. 8 is a diagram illustrating a result of cutting a part exceeding a cutoff intensity for each wavelength determined on the basis of an intensity spectrum of input light.

In the present embodiment, to avoid the above problem, when the intensity spectrum is designed, the filtering process based on the intensity spectrum of the input light La is performed on the intensity spectrum obtained by the inverse Fourier transform. That is, as shown by a graph G23 in FIG. 8, a part (region D1 in FIG. 7) exceeding the cutoff intensity for each wavelength determined on the basis of the intensity spectrum of the input light La is cut.

As a result, the intensity spectrum (function $A_{IFTA}(\omega)$) provided to the modulation pattern calculation unit 24 (modulation pattern calculation step S3) can be suppressed to the extent that the intensity spectrum does not exceed the intensity spectrum of the input light La. Therefore, according to the present embodiment, the intensity spectrum to bring the temporal intensity waveform of the output light Ld close to the desired waveform can be easily calculated using the iterative Fourier transform. Further, for example, as compared with a method of measuring a waveform of light after shaping and determining an intensity spectrum after trial and error, accuracy of a realized waveform with respect to the desired waveform can be improved. Furthermore, because the intensity loss is limited to a region D2 in FIG. 8, the intensity loss accompanying the intensity spectrum modulation can be suppressed minimally as compared with the case in which the entire intensity spectrum is reduced.

Further, in the present embodiment, the process (iterative Fourier transform step S22) by the iterative Fourier transform unit 23a and the process (filtering process step S23) by the filtering process unit 23b are repeatedly performed, however, each of these processes may be performed once. Even in this case, the above effects can be surely obtained. Here, the iterative Fourier transform is repeatedly performed with the filtering process being performed, so that the intensity spectrum to bring the temporal intensity waveform of the output light Ld close to the desired waveform can be obtained more accurately.

Further, as in the present embodiment, the cutoff intensity for each wavelength in the filtering process may substantially coincide with the intensity spectrum of the input light La. As a result, the intensity loss can be suppressed minimally while the intensity spectrum provided to the modulation pattern calculation unit 24 (modulation pattern calculation step S3) is maintained at the intensity equal to or smaller than the intensity spectrum of the input light La.

(Modification)

Here, a modification of the above embodiment is described. In the above embodiment, the filtering process is performed on the intensity spectrum function $C_k(\omega)$ in the function (k) obtained by the inverse Fourier transform (formula (n)), however, the filtering process may be performed on a normalized intensity spectrum, that is, a normalized intensity spectrum function $C'_k(\omega) = a \cdot C_k(\omega)$ obtained by multiplying the intensity spectrum function $C_k(\omega)$ by a normalization coefficient a (a is a real number larger than 0). Further, the modulation pattern calculation unit 24 (in the modulation pattern calculation step S3) may calculate the modulation pattern on the basis of the normalized intensity spectrum function $C'_k(\omega)$ after the filtering process.

Figure 9:
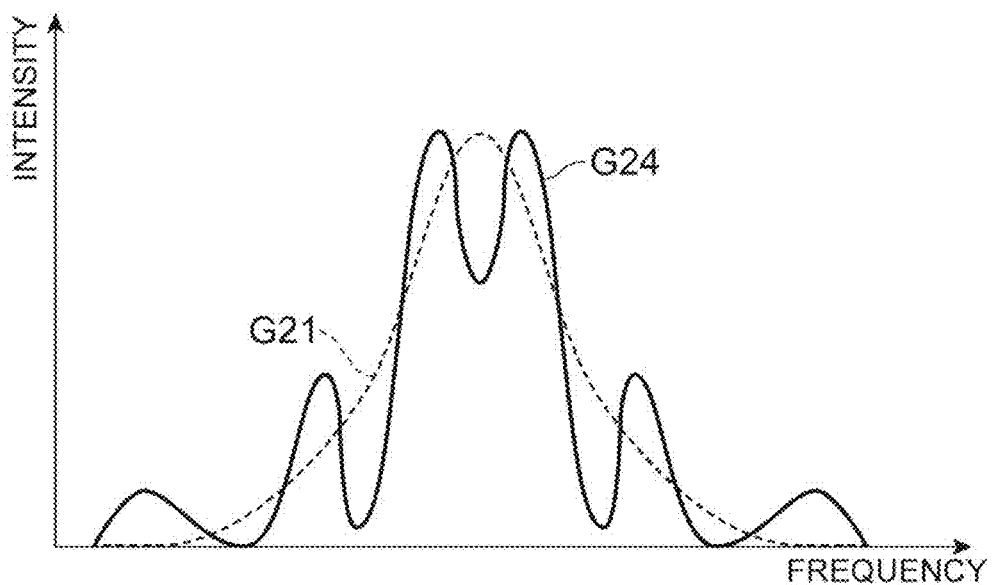
FIG. 9 includes (a) a diagram illustrating an example of an intensity spectrum obtained by multiplying a calculated intensity spectrum by a normalization coefficient, and (b) a diagram illustrating a result of performing a filtering process on the intensity spectrum of (a) in FIG. 9.
Figure 9:
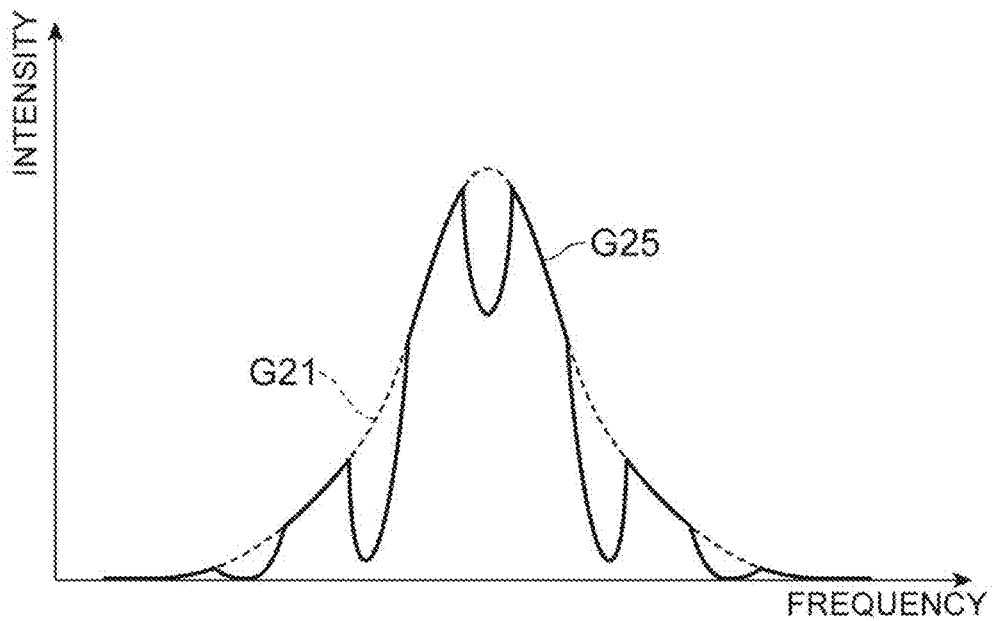

FIG. 9 includes graphs illustrating such a process. A graph G24 illustrated in (a) in FIG. 9 is an example of the normalized intensity spectrum function $C'_k(\omega)$ obtained by multiplying the graph G22 (that is, the intensity spectrum function $C_k(\omega)$) illustrated in FIG. 7 by the normalization coefficient a (a<1). Further, a graph G25 illustrated in (b) in FIG. 9 is obtained by performing the filtering process on the graph G24 with the graph G21 as the cutoff intensity. Even in this calculation method, the same effects as the effects according to the above embodiment can be obtained. Here, for example, the normalization coefficient may have a value in which a maximum value of the intensity spectrum function $C'_k(\omega)$ after the multiplication of the coefficient is substantially equal to a maximum value of the intensity spectrum of the input light La, or may have a value smaller than the above value.

Figure 10:
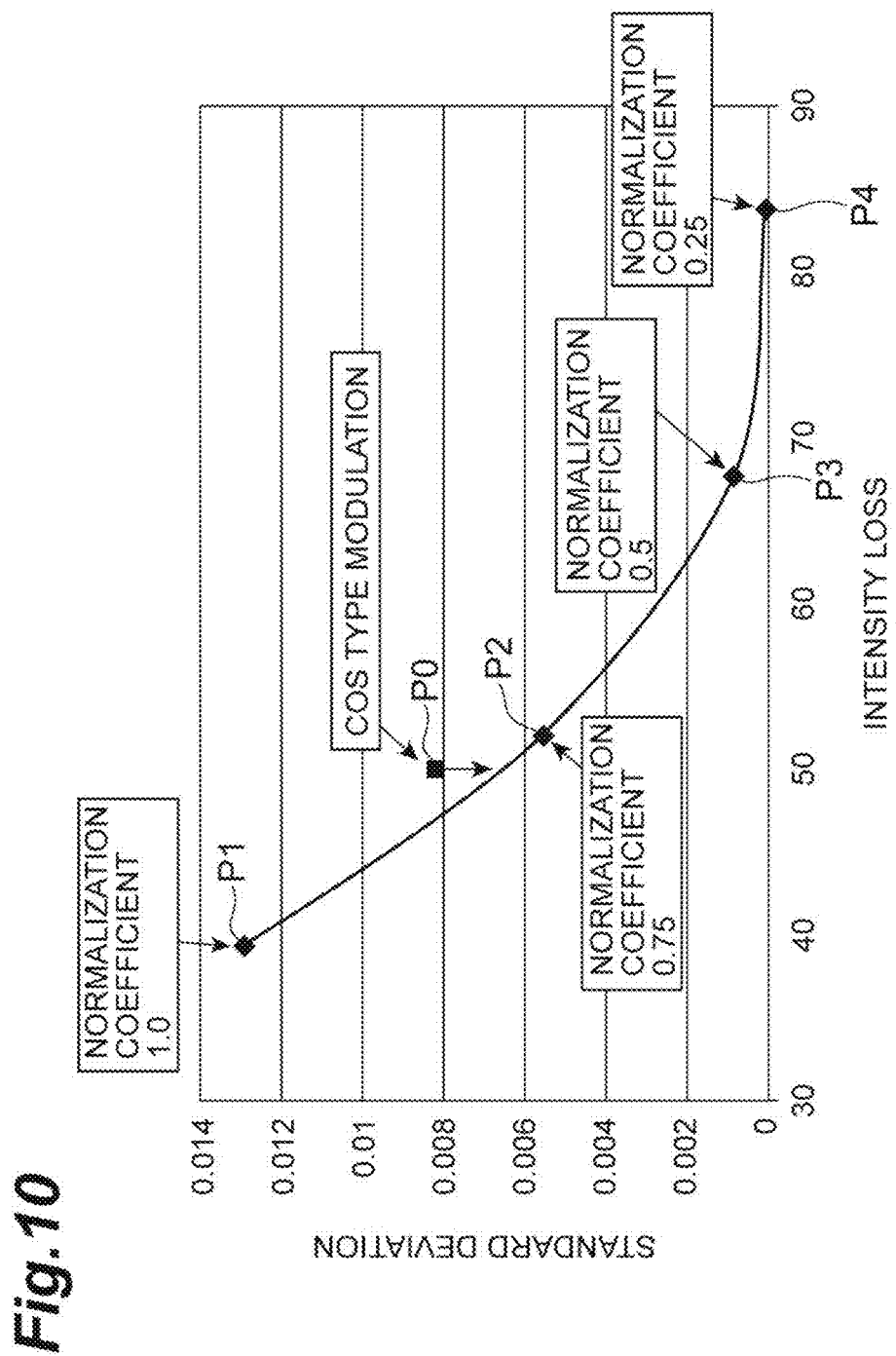
FIG. 10 is a graph illustrating a relation between intensity loss and waveform accuracy when a normalization coefficient is changed, in the case where a double pulse is set as a desired temporal intensity waveform.

A change in the intensity spectrum form due to a difference in the normalization coefficient is described. FIG. 10 is a graph illustrating a relation between intensity loss and waveform accuracy when the normalization coefficient is changed, in the case where a double pulse (two pulses having a time difference) is set as a desired temporal intensity waveform. Here, as an index of the waveform accuracy, a standard deviation with respect to the desired waveform is used. Further, a coefficient in the case of performing normalization such that the maximum value of the intensity spectrum function $C'_k(\omega)$ is equal to the maximum value of the intensity spectrum of the input light La (that is, the case of performing the normalization with the maximum value of the intensity spectrum of the input light La) is set as 1.0, and plots P1 to P4 when the not normalization coefficients are set as 1.0, 0.75, 0.5, and 0.25, respectively, are illustrated in FIG. 10.

Figure 11:
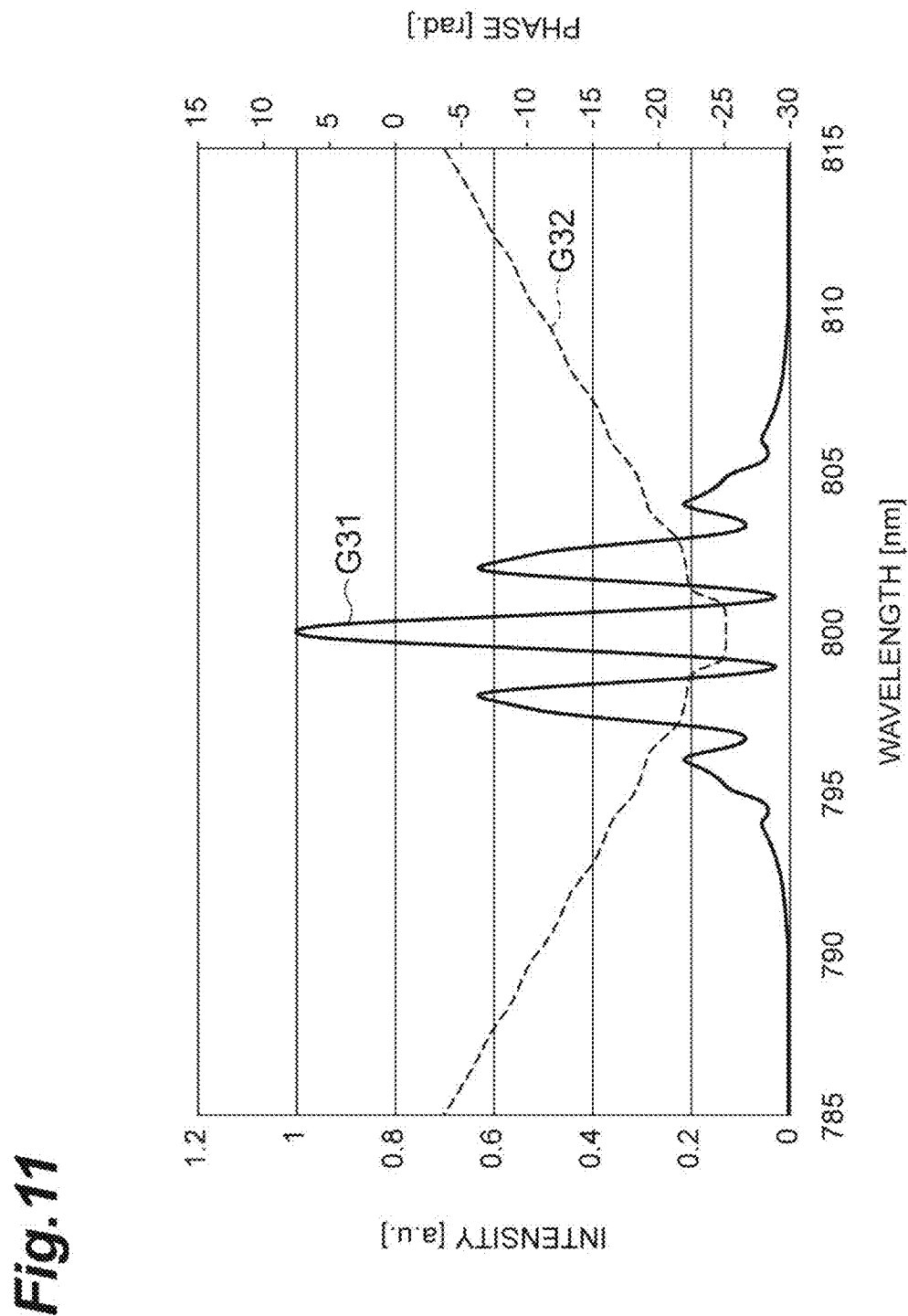
FIG. 11 is a diagram illustrating an intensity spectrum when a normalization coefficient is set as 1.0.
Figure 12:
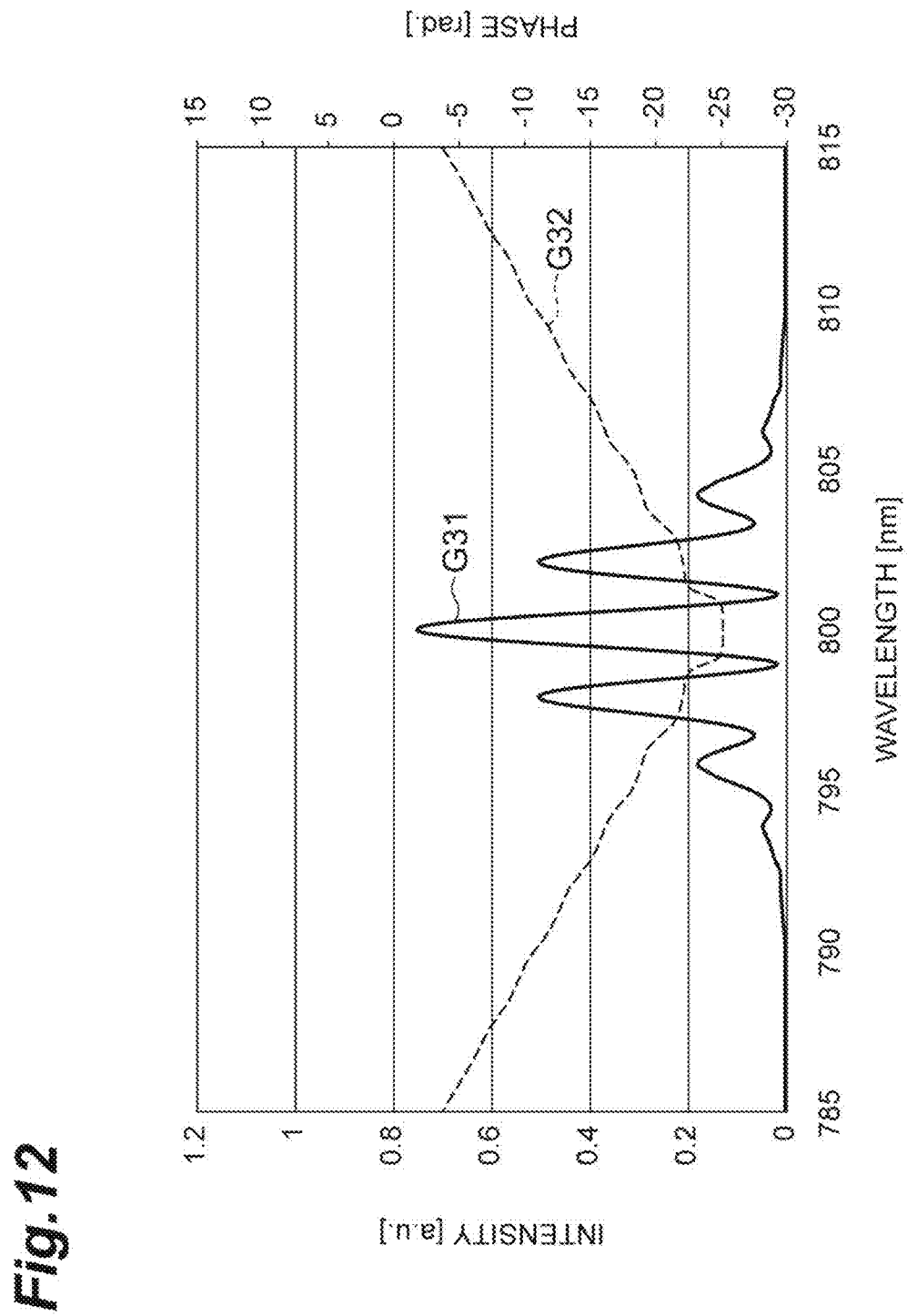
FIG. 12 is a diagram illustrating an intensity spectrum when a normalization coefficient is set as 0.75.

Here, FIG. 11 and FIG. 12 illustrate intensity spectra (graph G31) when the normalization coefficients are set as 1.0 and 0.75, respectively. A graph G32 in FIG. 11 and FIG. 12 is a phase spectrum and is fixed regardless of the normalization coefficient.

Referring to FIG. 10, when the value of the normalization coefficient increases, the waveform accuracy is deteriorated, but the intensity loss can be suppressed small. In contrast, when the value of the normalization coefficient decreases, the intensity loss increases, but the waveform accuracy can be further improved. Under such a trade-off, a suitable normalization coefficient may be determined according to a purpose and a use. For example, when the large intensity loss can be allowed, the waveform accuracy can be remarkably improved (to the extent that the standard deviation becomes almost zero) by decreasing the normalization coefficient.

Figure 13:
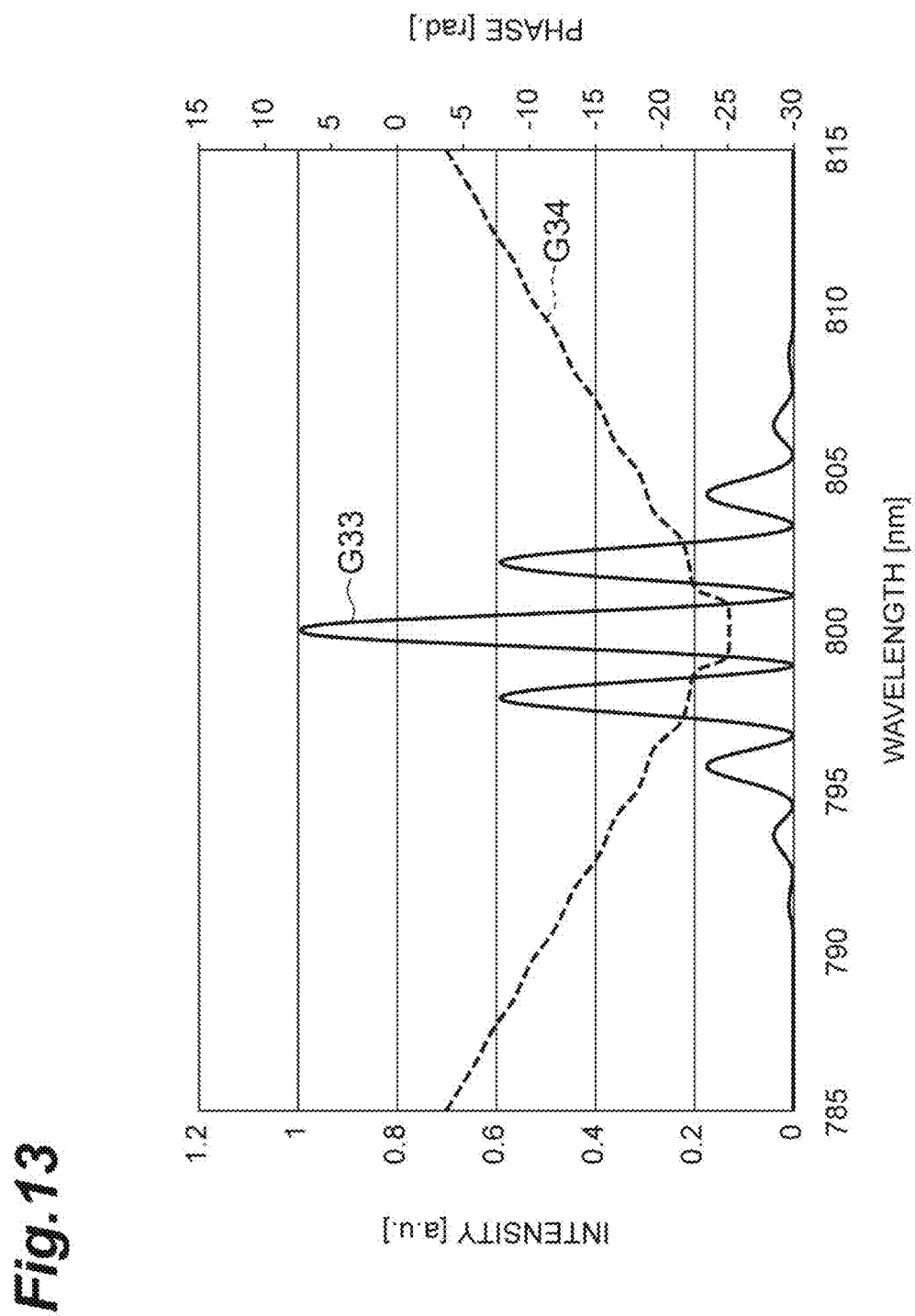
FIG. 13 is a diagram illustrating an intensity spectrum when COS type intensity modulation is applied.

Further, FIG. 10 also illustrates a plot P0 when COS type intensity modulation is applied as a comparative example. In this case, the standard deviation becomes 0.008 at the intensity loss of 50%. On the other hand, in the present modification, the standard deviation becomes 0.0064 at the same intensity loss (50%). As such, when the intensity loss of 50% is allowed, according to the present modification, the waveform accuracy can be improved by 20% as compared with the COS type intensity modulation. Here, FIG. 13 illustrates an intensity spectrum (graph G33) when the COS type intensity modulation is applied. A graph G34 in FIG. 13 is a phase spectrum.

Figure 14:
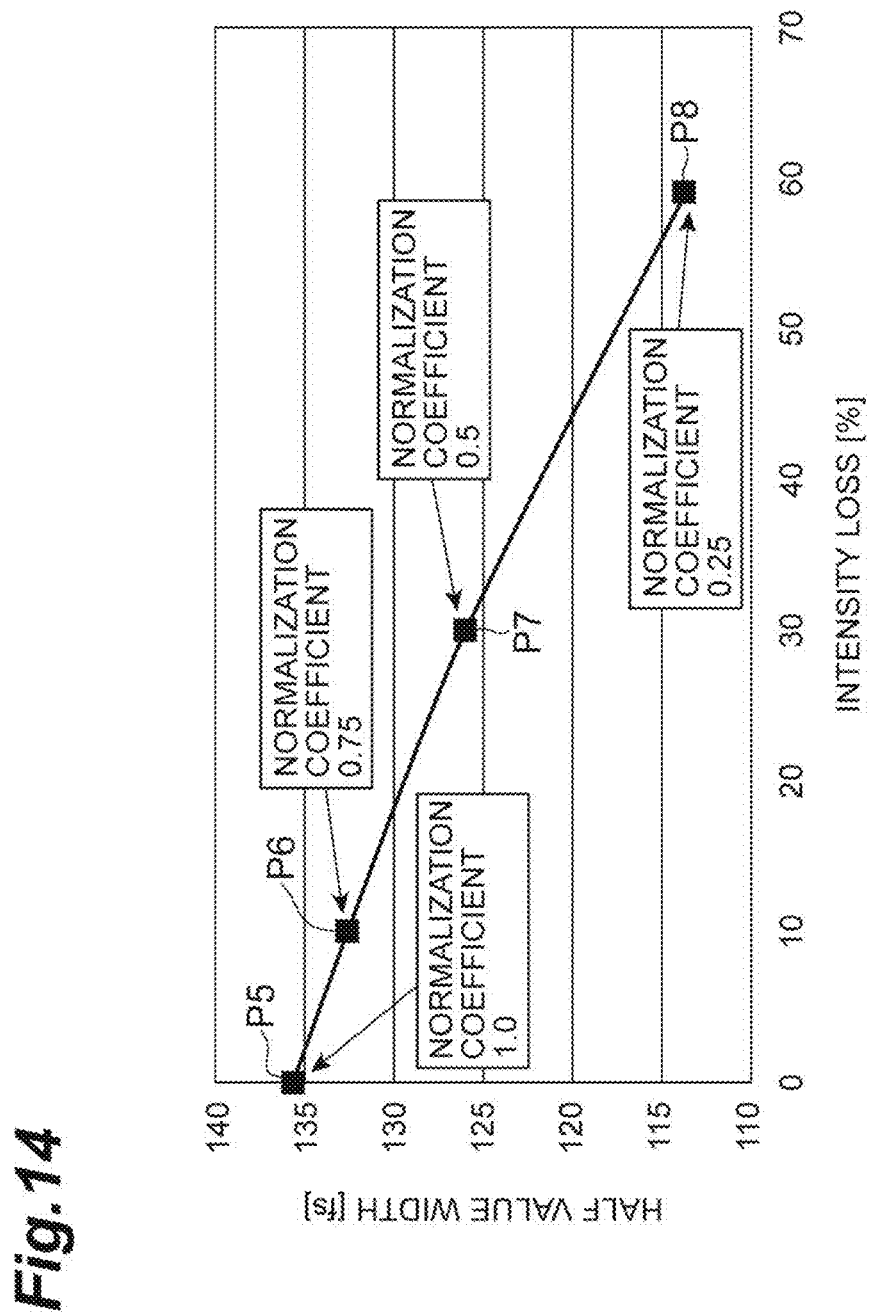
FIG. 14 is a graph illustrating a relation between intensity loss and full width at half maximum when a normalization coefficient is changed, in the case where a single pulse is set as a desired temporal intensity waveform.
Figure 15:
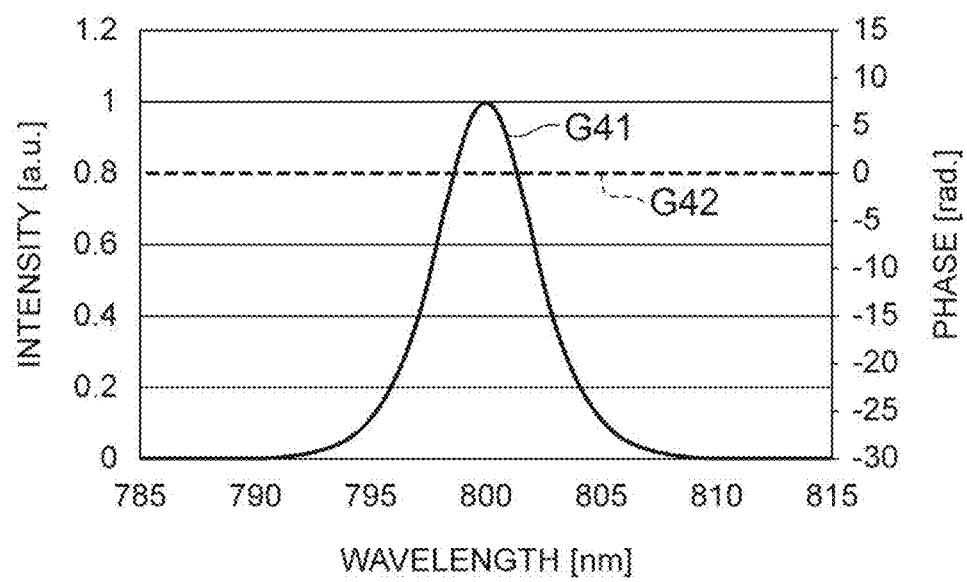
FIG. 15 includes (a), (b) diagrams illustrating intensity spectra when normalization coefficients are set as 1.0 and 0.5, respectively.
Figure 15:
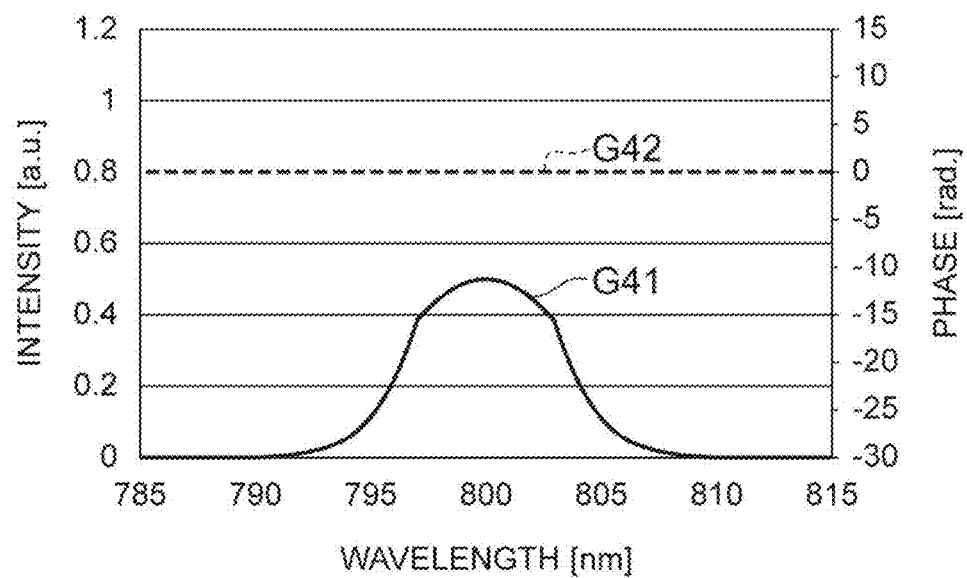

Next, a change in the time width of the pulse shaped temporal intensity waveform due to a difference in the normalization coefficient is described. FIG. 14 is a graph illustrating a relation of intensity loss and full width at half maximum (FWHM) when a normalization coefficient is changed, in the case in which a single pulse (of a time width shorter than a time width of a transform limited (TL) pulse) is set as a desired temporal intensity waveform. In FIG. 14, plots P5 to P8 when the normalization coefficients are set as 1.0, 0.75, 0.5, and 0.25, respectively, are illustrated. Here, (a) in FIG. 15 and (b) in FIG. 15 illustrate intensity spectra (graph G41) when the normalization coefficients are set as 1.0 and 0.5, respectively. A graph G42 in (a) in FIG. 15 and (b) in FIG. 15 is a phase spectrum and is fixed regardless of the normalization coefficient.

Referring to FIG. 14, when the value of the normalization coefficient increases, the pulse time width increases, but the intensity loss can be suppressed small. In contrast, when the value of the normalization coefficient decreases, the intensity loss increases, but the pulse time width can be further decreased. Under such a trade-off, a suitable normalization coefficient may be determined according to a purpose and a use.

Figure 16:
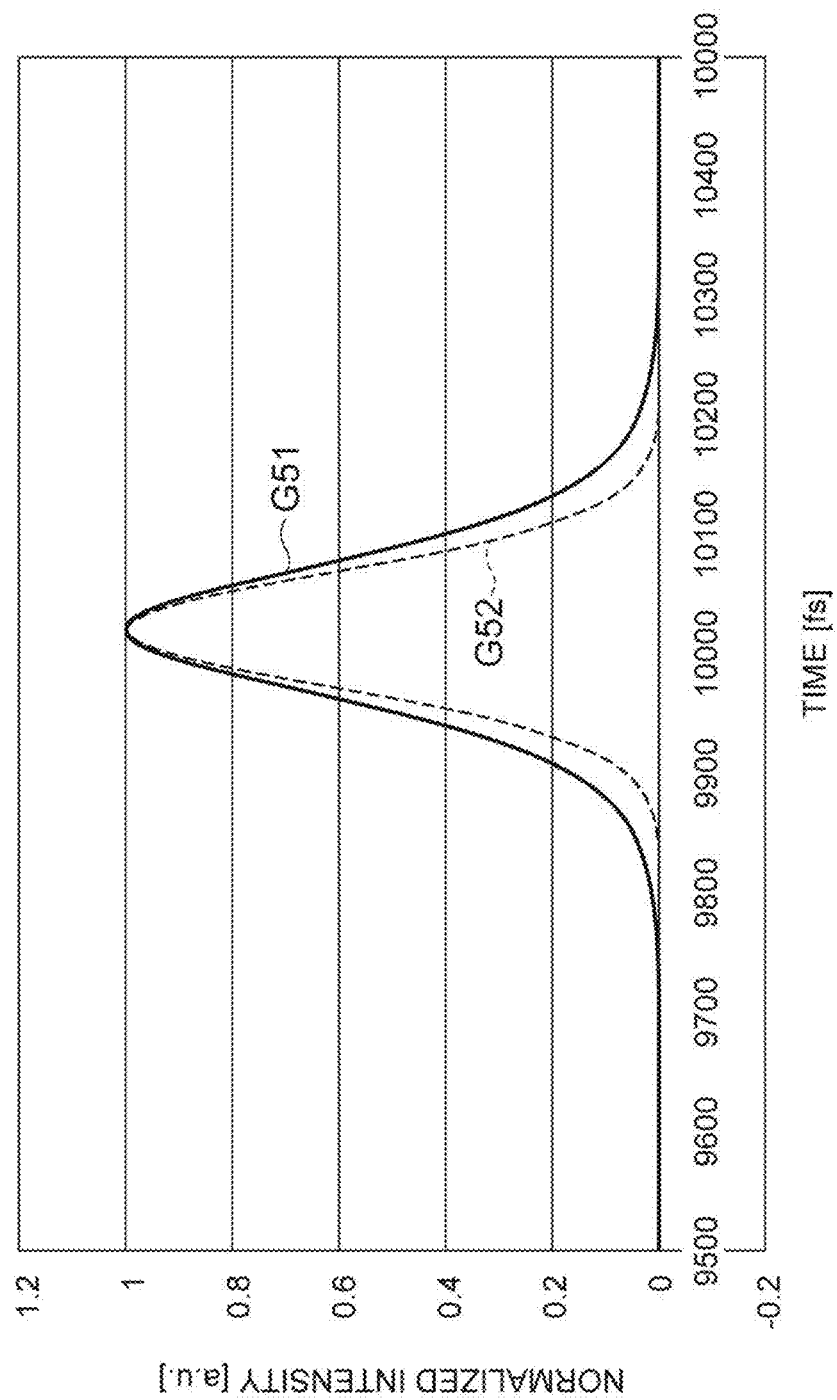
FIG. 16 is a diagram illustrating a TL pulse waveform and a waveform when a normalization coefficient is set as 0.25.

Further, according to the present modification, the normalization coefficient is set as a value less than 1.0, so that a light pulse of a time width shorter than a time width of a temporal waveform (it is called a transform limited pulse (TL pulse), FWHM is 135.5 fs) when the phase spectrum is flat and the intensity modulation is not performed can be generated. For example, when the normalization coefficient is set as 0.25, a waveform of which a time width is short by about 20 fs as compared with the TL pulse waveform is obtained. FIG. 16 illustrates a TL pulse waveform (G51) and a waveform (G52) when the normalization coefficient is set as 0.25.

The modulation pattern calculation apparatus, the light control apparatus, the modulation pattern calculation method, and the modulation pattern calculation program according to one aspect of the present invention are not limited to the embodiments and the modifications described above, and various other modifications are enabled.

For example, in the above embodiment, both the intensity spectrum and the phase spectrum to bring the temporal intensity waveform of the output light close to the desired waveform are calculated and the modulation pattern presented on the SLM is generated on the basis of these spectra. However, in the apparatus and the method according to the present invention, only the intensity spectrum to bring the output light close to the desired waveform may be calculated and the modulation pattern may be generated on the basis of the intensity spectrum and a previously prepared (or selected) phase spectrum. Alternatively, only the intensity spectrum to bring the output light close to the desired waveform may be calculated and the modulation pattern to modulate only the intensity spectrum without modulating the phase spectrum may be generated.

The modulation pattern calculation apparatus according to the above embodiment is an apparatus for calculating a modulation pattern presented on a spatial light modulator for modulating an intensity spectrum of input light to bring a temporal intensity waveform of light close to a desired waveform, and the apparatus includes an iterative Fourier transform unit for performing a Fourier transform on a waveform function in a frequency domain including an intensity spectrum function and a phase spectrum function, performing a replacement of a temporal intensity waveform function based on the desired waveform in a time domain after the Fourier transform and then performing an inverse Fourier transform, and performing a replacement to constrain the phase spectrum function in the frequency domain after the inverse Fourier transform; a filtering process unit for performing a filtering process of cutting a part exceeding a cutoff intensity for each wavelength determined on the basis of the intensity spectrum of the input light, on the intensity spectrum function in the frequency domain after the inverse Fourier transform or a normalized intensity spectrum function obtained by multiplying the intensity spectrum function by a normalization coefficient; and a modulation pattern calculation unit for calculating the modulation pattern on the basis of the intensity spectrum function or the normalized intensity spectrum function after the filtering process.

Further, the modulation pattern calculation method according to the above embodiment is a method for calculating a modulation pattern presented on a spatial light modulator for modulating an intensity spectrum of input light to bring a temporal intensity waveform of light close to a desired waveform, and the method includes an iterative Fourier transform step of performing a Fourier transform on a waveform function in a frequency domain including an intensity spectrum function and a phase spectrum function, performing a replacement of a temporal intensity waveform function based on the desired waveform in a time domain after the Fourier transform and then performing an inverse Fourier transform, and performing a replacement to constrain the phase spectrum function in the frequency domain after the inverse Fourier transform; a filtering process step of performing a filtering process of cutting a part exceeding a cutoff intensity for each wavelength determined on the basis of the intensity spectrum of the input light, on the intensity spectrum function in the frequency domain after the inverse Fourier transform or a normalized intensity spectrum function obtained by multiplying the intensity spectrum function by a normalization coefficient; and a modulation pattern calculation step of calculating the modulation pattern on the basis of the intensity spectrum function or the normalized intensity spectrum function after the filtering process.

Further, the modulation pattern calculation program according to the above embodiment operates a computer, in a modulation pattern calculation apparatus for calculating a modulation pattern presented on a spatial light modulator for modulating an intensity spectrum of input light to bring a temporal intensity waveform of light close to a desired waveform, as an iterative Fourier transform unit for performing a Fourier transform on a waveform function in a frequency domain including an intensity spectrum function and a phase spectrum function, performing a replacement of a temporal intensity waveform function based on the desired waveform in a time domain after the Fourier transform and then performing an inverse Fourier transform, and performing a replacement to constrain the phase spectrum function in the frequency domain after the inverse Fourier transform; a filtering process unit for performing a filtering process of cutting a part exceeding a cutoff intensity for each wavelength determined on the basis of the intensity spectrum of the input light, on the intensity spectrum function in the frequency domain after the inverse Fourier transform or a normalized intensity spectrum function obtained by multiplying the intensity spectrum function by a normalization coefficient; and a modulation pattern calculation unit for calculating the modulation pattern on the basis of the intensity spectrum function or the normalized intensity spectrum function after the filtering process.

In the above apparatus, the method, and the program, the process (iterative Fourier transform step) by the iterative Fourier transform unit and the process (filtering process step) by the filtering process unit may be repeatedly performed, and in the modulation pattern calculation step, the modulation pattern calculation unit may calculate the modulation pattern on the basis of the intensity spectrum function or the normalized intensity spectrum function obtained by the filtering process after the repetition. As such, the iterative Fourier transform is repeatedly performed with the filtering process being performed, so that the intensity spectrum to bring the temporal intensity waveform of the light close to the desired waveform can be obtained more accurately.

In the above apparatus, the method, and the program, the cutoff intensity for each wavelength in the filtering process may coincide with the intensity spectrum of the input light. As a result, the intensity loss can be suppressed minimally while the intensity spectrum provided to the modulation pattern calculation unit (modulation pattern calculation step) is maintained at the intensity equal to or smaller than the intensity spectrum of the input light.

In the above apparatus, the method, and the program, the coefficient may have a value in which a maximum value of the intensity spectrum represented by the normalized intensity spectrum function is substantially equal to a maximum value of the intensity spectrum of the input light.

Further, the light control apparatus according to the above embodiment includes the modulation pattern calculation apparatus described above; a light source for outputting the input light; a dispersive element for spectrally dispersing the input light; a spatial light modulator for modulating the intensity spectrum of the input light after the dispersion and outputting modulated light; and an optical system for focusing the modulated light. The spatial light modulator presents the modulation pattern calculated by the modulation pattern calculation apparatus.

According to this apparatus, the modulation pattern calculation apparatus described above is included, so that the intensity spectrum to bring the temporal waveform of the light close to the desired waveform can be easily calculated.

INDUSTRIAL APPLICABILITY

The present invention can be used as a modulation pattern calculation apparatus, a light control apparatus, a modulation pattern calculation method, a modulation pattern calculation program, and a computer readable medium capable of easily calculating an intensity spectrum to bring a temporal waveform of light close to a desired waveform.

REFERENCE SIGNS LIST

1A—light control apparatus, 2—light source, 10—optical system, 12—dispersive element, 14—curved mirror, 16—spatial light modulator (SLM), 17—modulation plane, 17a—modulation region, 20—modulation pattern calculation apparatus, 21—arbitrary waveform input unit, 22—phase spectrum design unit, 22a—iterative Fourier transform unit, 23—intensity spectrum design unit, 23a—iterative Fourier transform unit, 23b—filtering process unit, 24—modulation pattern calculation unit, La—input light, Ld—output light.

The invention claimed is:
1. A light control apparatus comprising:
a modulation pattern calculation apparatus for calculating a modulation pattern presented on a spatial light modulator configured to modulate an intensity spectrum of input light;
a light source configured to output the input light;
a dispersive element configured to spectrally disperse the input light;
the spatial light modulator configured to modulate the intensity spectrum of the input light after the dispersion and output modulated light; and
an optical system configured to focus the modulated light,
wherein the spatial light modulator is configured to present the modulation pattern calculated by the modulation pattern calculation apparatus, and
wherein the modulation pattern calculation apparatus including a storage device having instructions stored thereon, and one or more hardware processors coupled to the storage device, and configured to read instructions from the storage device to cause the modulation pattern calculation apparatus to perform operations comprising:
preparing a waveform function in a frequency domain, the waveform function including an initial intensity spectrum function and an initial phase spectrum function;
performing for at least one iteration the following:
preparing the waveform function in the frequency domain, the waveform function including an intensity spectrum function and a phase spectrum function;
performing a Fourier transform, from the frequency domain to a time domain, on the calculated waveform function to obtain a time domain waveform function including a temporal intensity waveform function;
performing a replacement of the temporal intensity waveform function based on a desired waveform in the time domain;
performing an inverse Fourier transform, from the time domain to the frequency domain, on the time domain waveform function including the replaced temporal intensity waveform function to obtain an updated waveform function including an updated intensity spectrum function and an updated phase spectrum function;
performing, on the updated waveform function, a replacement of the updated phase spectrum function with the initial phase spectrum function in the frequency domain;
obtaining a normalized intensity spectrum function by multiplying the intensity spectrum function of the updated waveform function by a normalization coefficient;
determining a cutoff intensity for each wavelength on the basis of the intensity spectrum of the input light; and
performing, on the normalized intensity spectrum function, a filtering process of cutting a part of the normalize intensity spectrum function exceeding the cutoff intensity for each wavelength, wherein, in performing the filtering process, at a frequency where the normalized intensity spectrum function is larger than the cutoff intensity, a value of the cutoff intensity is taken as the value of the normalized intensity spectrum function, and at a frequency where the normalized intensity spectrum function is equal to or smaller than the cutoff intensity, a value of the normalized intensity spectrum function is taken as the value of the normalized intensity spectrum function; and
calculating, after performing for the at least one iteration, the modulation pattern on the basis of the normalized intensity spectrum function.
2. The light control apparatus according to claim 1, wherein performing for the at least one iteration includes performing for at least two iterations, and
wherein calculating the modulation pattern on the basis of the normalized intensity spectrum function is performed after the at least two iterations.

3. The light control apparatus according to claim 1, wherein the cutoff intensity for each wavelength in the filtering process is set to coincide with the intensity spectrum of the input light.

4. The light control apparatus according to claim 1, wherein the normalization coefficient has a value in which a maximum value of an intensity spectrum represented by the normalized intensity spectrum function is equal to a maximum value of the intensity spectrum of the input light.

* * * * *